June 21, 1960 — L. H. KNOST — 2,941,491
CLAMPING MECHANISM FOR SEAM WELDING MACHINES
Filed July 21, 1953 — 2 Sheets-Sheet 1

INVENTOR.
Lloyd H. Knost
BY Eberhard E. Welter
Atty.

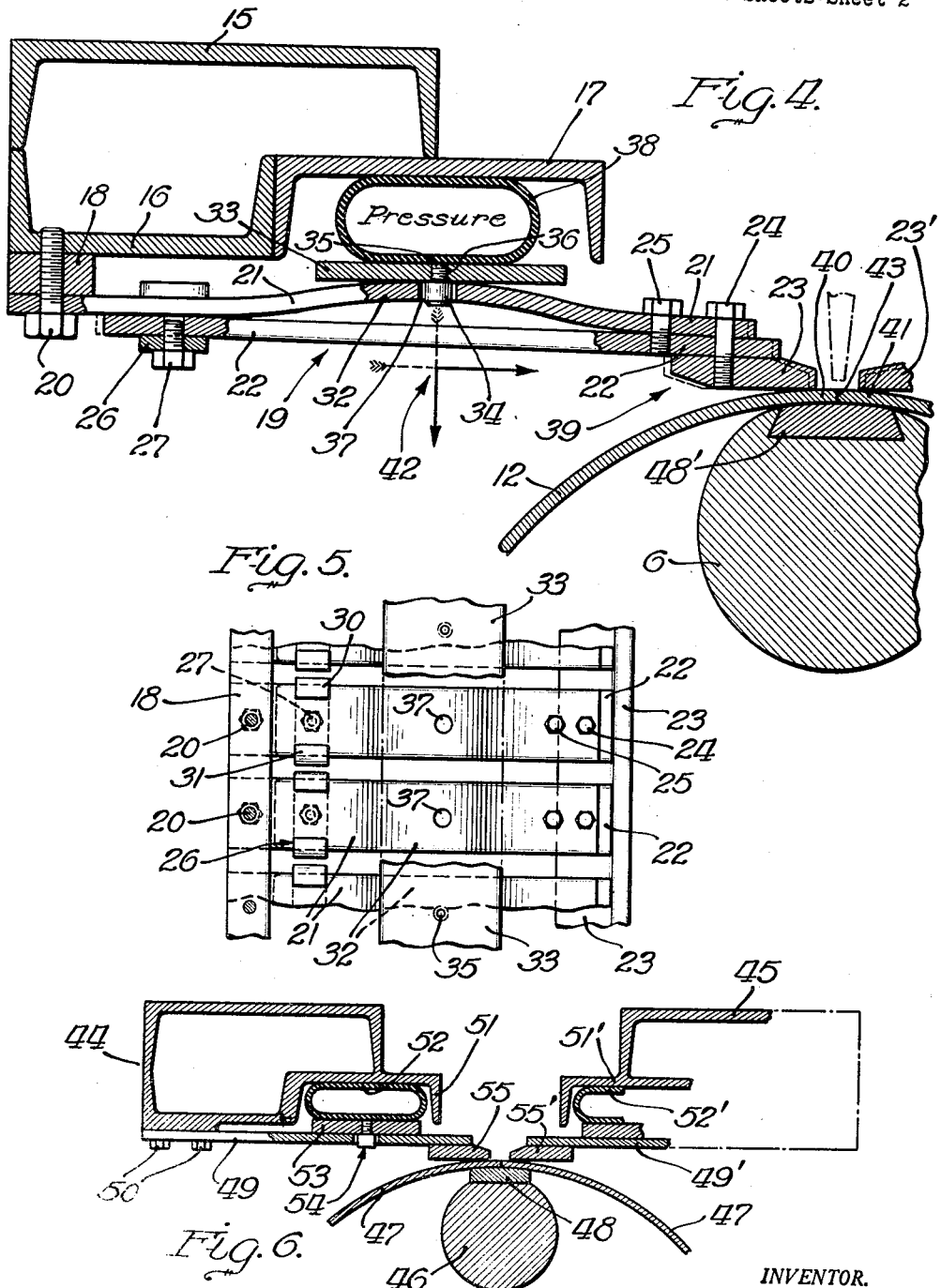

United States Patent Office 2,941,491
Patented June 21, 1960

2,941,491

CLAMPING MECHANISM FOR SEAM WELDING MACHINES

Lloyd H. Knost, % The Reed Engineering Co., 1003–17 West Fairview Ave., Carthage, Mo.

Filed July 21, 1953, Ser. No. 369,309

20 Claims. (Cl. 113—59)

This invention in general relates to seam welding machines adapted for running a welding head along the seam of adjacent metal pieces which are supported in predetermined relation with respect to the welding head, with the latter operating therealong to join such metal pieces together.

More specifically, the present invention is directed to clamping structures that are associated with a supporting unit which, together with the clamping mechanisms, position the end portions of the metal pieces that are being welded together.

It is one of the objects of the present invention to provide a clamping mechanism in the form of two units which flank the opposite sides of the supporting member or backstop and wherein the clamping members are independently rendered active to force opposite edge portions of a blank such as a cylindrical unit into flat and firm engagement with the backstop and to simultaneously induce a pressure across the surface of the backstop and against the edge portions of the blank whereby an upsetting action is attained at the welding area.

Under certain conditions of operation, the present invention incorporates the use of flat spring members providing cantilever units which are supported at one end from a suitable mounting and which carry a continuous shoe at the outer free ends thereof for engaging the blank and to press the latter upon a support adjacent the welding seam of the blank metal. With this construction a plurality of such cantilever spring units are employed which also carry a connecting reactionary member which spans all of the units and which is used as a pressure means for collectively actuating all of said spring units into a position to depress a continuous shoe against the edges of a blank located upon an arbor or support. In this connection, it might also be understood that the shoe may be made in interrupted lengths instead of a continuous length so as to be carried by one or more of the cantilever spring units in carrying out the clamping action of these devices.

In the aforementioned construction using single cantilever springs to support the shoe or shoes, the latter elements are subject to tilting action particularly when the amount of depression of the shoes covers a relatively greater distance between the normal inoperative position of the shoe and the clamping position on a blank on an arbor.

It is, therefore, another object of the present invention to provide a cooperative pair of bar members having a predetermined amount of resiliency and which together carry a shoe or shoes in the position wherein the latter will engage the adjacent edge of a blank to clamp the same against the arbor or supporting backstop. In this particular construction, one of the cantilever members is provided with a hump intermediate the length thereof which is depressed against the other of the members which defines a stabilizing bar and guide member and wherein the shoe or shoes are carried on the outer free ends of the two cooperative units, such units having one bar secured to a mounting and the other end of the bar relatively slidable with respect to the first bar. This induces a composite movement at the shoe end of the cantilever construction wherein a certain amount of depressed action is produced to bring the shoe against the blank metal, and these units are relatively cooperative to move the shoe laterally with respect to the support and in a direction across the surface thereof. With the latter function of the shoe it is possible to create a side thrust in one portion of the metal at the seam so that with the use of a pair of such clamping units or assemblies at each side of the seam to be welded, it is possible to induce an upsetting action at the weld which is highly desirable in a number of situations, one of which relates to the use of equipment for inert gas welding or similar work. Under such conditions and with this particular clamping mechanism of the present invention, it is possible to upset the metal at the point of welding with the obvious simultaneous function of the shoe and the clamping mechanism supporting the same to perform the function of holding the blank tightly against the supporting arbor during the welding process.

It is another object of the present invention to provide cantilever spring members that hold the shoe and which also function to return to a normal inactive position, thus providing a means for resetting any pressure actuated mechanism used for manipulating or depressing such cantilever springs. In the present design such actuating mechanism comprises a pressure hose which is positioned and arranged to engage the cantilever spring units intermediate the length thereof and transmit the active forces created thereby to the reactionary bar hereinbefore mentioned for simultaneous collective action of spring depression.

As a further object of this invention the pressure unit transmits its force to the composite spring supporting shoe structure in the areas immediately adjacent or above the hump carrying bars that support the shoe.

Other objects and advantages relating to the present design of clamping mechanism adapted for securing adjacent metal pieces into a welding position upon an arbor shall hereinafter appear in the following detailed description having reference to the accompanying drawings forming a part of this specification.

In the drawings:

Figure 4 is an enlarged fragmentary view of one set of the clamping units and more particularly of one unit thereof which shows the composite action of this unit carrying out the function for which the same was devised, certain parts of this illustration being further broken away and shown in section to show other details of construction thereof;

Figure 5 is a fragmentary plan view of the left hand assembly of the clamping units as illustrated in Figure 2 and as seen substantially along the line 5—5 therein; and Figure 6 is a modified arrangement of clamping unit incorporating certain principles of operation that vary the clamping action of the units in respect to the preferred construction illustrated in the other figures in the drawings.

Figure 1:
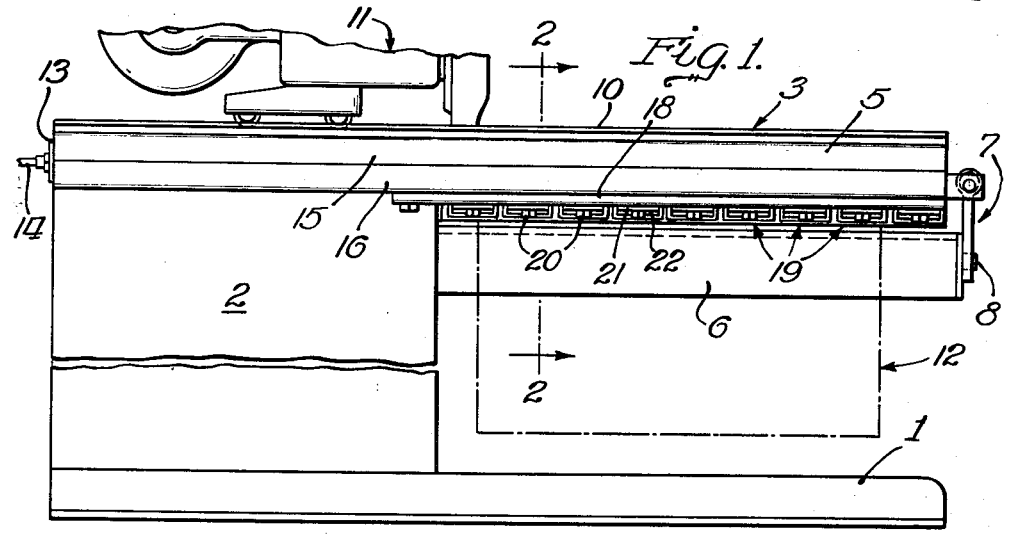
Figure 1 is a side elevational view of a seam welding machine incorporating the clamping mechanisms of the present invention.
Figure 2:
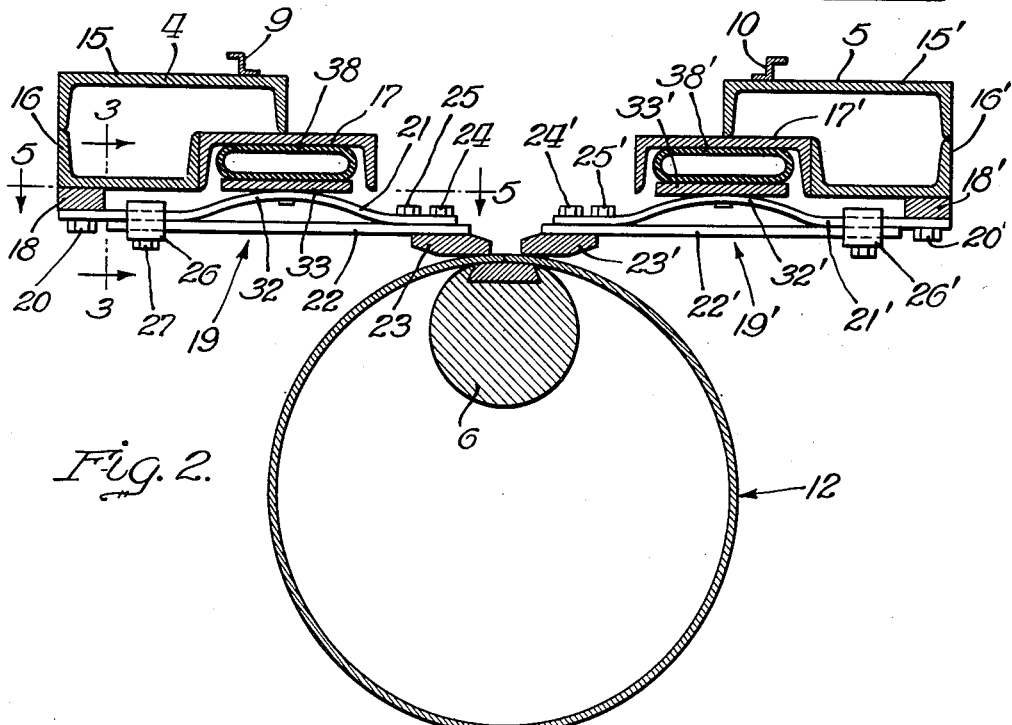
Figure 2 is a transverse cross sectional view of the welding machine substantially as seen along the plane of line 2—2 in Figure 1.

The seam welding machine illustrated in Figure 1 comprises a base 1 carrying a standard 2 which supports the overhanging mounting structure 3 that is specifically arranged and constructed for carrying all of the clamping units. The mounting structure 3 is divided into left and right hand structural units 4 and 5 as best seen in Figure 2, which are arranged laterally outwardly with respect to the reactionary back-up support or arbor 6 which is normally carried at one end to pivot within the standard 2. As shown in Figure 1, suitable clamping and securing means 7 is provided between one or both of the structures 4 and 5 and the end pin 8 of the arbor 6 to bring such arbor or support into a given relation with respect to the mounting structures 4 and 5.

Suitable rail or track means 9 and 10 are carried upon the mounting structures 4 and 5 to support an automatic welding head 11 which is diagrammatically shown in Figure 1. The welding head may be supplanted by any other suitable means which will provide a weld along the seam of a blank 12 as shown in dot and dash lines in Figure 1 and in full lines in Figure 2. A suitable air system 13 receiving air under pressure through a supply hose 14 is conveniently connected with the power units herein employed for actuating the clamping means. Such units will be hereinafter described.

Referring now to Figure 2, it is to be understood that the left and right hand structures 4 and 5 are identical except for their relation with respect to the arbor 6. The following description will, therefore, be directed to the left hand structure 4 applying reference numerals thereto and using the same reference numerals primed in relation to the same parts in the mounting structure 5.

The mounting structure 4 is built up in any suitable fashion and preferably comprises three joined and welded channel irons 15, 16 and 17 to form a box structure of considerable strength to support all of the clamping units. A mounting bar 18 in the form of a spacer is positioned adjacent one edge of the mounting structure 4 and the plurality of cantilever spring units 19 are secured by means of bolts 20 which thread through the mounting bar 18 and into the channel iron 16.

Each of the cantilever units 19 is constructed from a pair of coacting bars 21 and 22 of limited resiliency which are co-related in superimposed relation to support a clamping shoe 23 in a given predetermined relation with respect to the support or arbor 6 that constitutes a reactionary backstop in a seam welding machine. As shown in Figure 4, the shoe 23 is secured to the swingable ends of both of the bars 21 and 22 by means of a suitable bolt or bolts such as 24, and an additional bolt 25 provides additional fastening means to secure the free ends of the bars 21 and 22 together.

Figure 3:
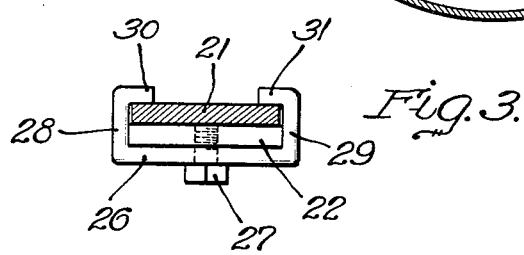
Figure 3 is a small detailed cross sectional view taken substantially along the line 3—3 in Figure 2.

As shown in Figures 2 and 4, the end of the bar 22 adjacent the mounting 18 is freely supported with respect to the coacting bar 21, and bar 22 carries a bracket guide member 26 which is secured to the bar 22 by means of bolt 27. As shown in Figure 3, the bracket 26 is C-shaped having the vertical legs 28 and 29 straddling both bars with overhanging lips 30 and 31 engaging the upper surface of the upper bar 21.

Additionally, the bar 21 is provided with an arched center forming a hump 32 intermediate the length thereof. This arched center or hump 32 is curved outwardly and away from the bar 22 and further supports a reactionary bar 33 which preferably extends longitudinally of the machine to overlie the entire set of cantilever spring units as best illustrated in Figures 4 and 5.

Positioning means are employed to maintain the relation of the reactionary bar with respect to the hump portions of the cantilever springs 21 and these positioning means each comprise a stud 34 having a threaded shank 35 which threads into a suitable opening 36 formed in the reactionary bar. Stud 34 rides within a bore 37 that is preferably formed centrally in each cantilever spring 21.

The means for actuating the clamping units which is herein employed includes a length of fire hose 38, or other suitable expanding member, which is sealed at the ends and which can be expanded by air under pressure supplied through the hose 14 shown in Figure 1. As best seen in Figures 2 and 4, this expandible hose unit is held in position within the confines of the inverted channel iron 17 and is positioned in superimposed relation with respect to the reactionary bar 33 that normally rides the humps 32 of the bars 21. This hose structure or expandible power unit 38 is shown substantially in its collapsed position in Figure 2 wherein the hump 32 of the bar 21 is also in its normally maximum raised position with respect to the bar 22. This fire hose can obviously be collapsed by the spring structure of the clamping members as such structure returns to its normal extended position in relation to its mounting means 18 carried by the structure 4. As pressure is inserted into the hose 38, it becomes expanded as shown in Figure 4 forcing the reactionary bar or plate 33 downwardly at the hump of bar 21 transmitting this pressure to collapse the bar 21 at the hump while simultaneously causing a reaction of the entire bar 21 against the bar 22 to depress the shoe 23 in a generally vertical direction against the adjacent edge portion of the blank 12.

This same action causes the end portion 39 of the cantilever clamp unit best shown in Figure 4 to move laterally toward and across the surface of the arbor 6 shifting the shoe 23 and the bar 22 substantially from the broken line positions therein indicated to the full line position shown. This action produces the lateral thrust which forces the edge portion 40 of the blank in a direction to upset against the end portion 41 of the other part of the same or similar blank.

Thus the pressure action produced by the hose 38 or other expandible mechanism will cause each cantilever shoe supporting unit to move in the composite directions indicated by the arrows shown at 42 in Figure 4. With the two shoes 23 and 23' acting oppositely and toward each other as shown in Figure 4, a desirable upsetting action at the seam 43 is accomplished. It should also be noted that the two bars coact in a manner to prevent tilting of the shoe 23 and normally maintain this shoe substantially level as the composite bars are actuated through the hump arrangement which compensates for any turning of the shoe and merely actuates the shoe laterally with respect to the anvil or support 6.

With reference to Figure 6, this construction depicts a simple cantilever spring arrangement for supporting the clamping shoes of a seam welding machine. In this construction, similar mounting units or structural assemblies 44 and 45 are carried at opposite sides of an anvil or arbor 46 which provides a backstop or support for the metal ends of a blank or blanks 47 to position such units upon the non-ferrous rail 48 carried by the arbor 46. In the preferred construction, a similar non-ferrous rail such as 48' is employed as a backstop unit.

In the Figure 6 construction, a plurality of springs or bars 49 are connected as at 50 to the mounting 44. A similar inverted chamber unit 51 is used to house the pressure hose 52 as an expandible unit that reacts against a reactionary bar 53 as connected by means of the alignment stud 54 with the bar 49. Bar 49 carries the shoe 55 which functions as a clamping member to engage the edge of the blank 47 and to depress the same against the anvil 46.

This particular modification contemplates the use of extremely simple spring bars which can be depressed to provide the clamping action at the arbor and which are also returnable under their own resiliency to a normal extended position wherein they collapse the expandible or power operated means 52.

The foregoing description has been directed to a preferred and modified construction of apparatus devised for carrying out the fundamental concept of the present invention. Certain changes in the respective elements or in the combination of elements are contemplated and may be used in carrying out the principles set forth by this invention. However, any modifications and changes shall be governed by the breadth and scope of the appended claims as directed to this invention.

What I claim is:

1. In a seam welding machine, a work support to carry the adjacent edges of a piece of work to be welded, a work holding mechanism comprising spaced mountings flanking said support, spring units each suspended by their end portions from both of said spaced mountings and having their free ends projecting toward said work support, shoes connected with the free ends of the spring units of each mounting and arranged to engage the respective edges of said piece of work to urge the latter into tight engagement with said support, said spring units including an upwardly arched section in their lengths, and actuating means for said spring units arranged for downward bodily contact with said upwardly arched sections of said spring units respectively to bodily flex each set of spring units in a direction to bring the respective shoes into downwardly directed holding contact with the edges of the piece of work while continued downward motion of said actuating means against said upwardly arched sections causes said sections to straighten moving the attached shoes toward each other to thereby frictionally urge said adjacent edges of the work piece against each other.

2. In a seam welding machine, a work support to carry the adjacent edges of a piece of work to be welded, a work holding mechanism comprising spaced mountings flanking said support, a plurality of spring units each of which is suspended by an end portion from one of said spaced mountings and having its other end portion projecting toward said work support, shoes connected with the free ends of each set of spring units and arranged to engage the respective edges of said piece of work to urge the latter into tight engagement with said support, said spring units each including an upwardly arched section provided intermediate their lengths, and actuating means for said spring units arranged for downward bodily engagement at said upwardly arched sections of said spring units respectively to bodily flex each set of spring units in a direction to bring the respective shoes into downwardly directed holding contact with the edges of the piece of work while continued downward pressure of said actuating means upon said upwardly arched sections of said spring units causes said sections to straighten to displace the attached shoes toward each other to frictionally urge said adjacent edges of the work piece against each other, said actuating means each including operative means constructed and arranged to simultaneously engage all of the spring units of one mounting and to flex all said units in a direction to cause said dual action shoe engagement with the work.

3. In a seam welding machine, a work support to carry the adjacent edges of a piece of work to be welded, a work holding mechanism comprising spaced mountings flanking said support, resilient units having fixed connection with said mountings from which said units are suspended in cantilever fashion from each of said mountings and arranged to project toward said work support, shoes connected with the free ends of each set of resilient units and arranged to engage the respective edges of said piece of work to urge the latter into tight engagement with said support, and actuating means to operatively contact and to bodily flex each set of resilient units in a direction to bring the respective shoes into holding contact with the edges of the piece of work under the flexing reaction of said resilient units respectively, said actuating means each comprising an expandible member disposed to react against said respective resilient units of one set, and a continuous reactionary member interposed between each of said expandible members and said resilient units adjacent thereto to provide a unitary member to bridge the multiple unit set and to transmit the entire force of said expandible member over all of said resilient units in said set, whereby said resilient units when released by said actuating means will automatically retract the work engaging shoe connected to the free ends of each set of resilient units from contact with the piece of work being welded.

4. In a seam welding machine, a work support to carry the adjacent edges of a piece of work to be welded, a work holding mechanism comprising spaced mountings flanking said support, resilient units having fixed connection with said mountings from which said units are suspended in cantilever fashion from each of said mountings and arranged to project toward said work support, shoes connected with the free ends of each set of resilient units and arranged to engage the respective edges of said piece of work to urge the latter into tight engagement with said support, and actuating means to operatively contact and to bodily flex each set of resilient units in a direction to bring the respective shoes into holding contact with the edges of the piece of work under the flexing reaction of said resilient units respectively, said actuating means each comprising an expandible member disposed to react against said respective resilient units of one set, and a continuous reactionary member interposed between each of said expandible members and said resilient units adjacent thereto to provide a unitary member to bridge the multiple unit set and to transmit the entire force of said expandible member over all of said resilient units in said set, whereby said resilient units when released by said actuating means will automatically retract the work engaging shoe connected to the free ends of each set of resilient units from contact with the piece of work being welded, and positioning mechanisms interposed between said reactionary member and said resilient units to maintain said associated parts in operative relation with respect to each other.

5. In a seam welding machine, a work support to carry the adjacent edges of a piece of work to be welded, a work holding mechanism comprising spaced mountings flanking said support, resilient units suspended from each of said mountings and projecting toward said work support, shoes fixedly connected with the outer ends of each set of resilient units and arranged to engage the respective edges of said piece of work to urge the latter into tight engagement with said support, actuating means operative to bodily flex each set of resilient units in a direction to bring the respective shoes into holding contact with the edges of the piece of work under the flexing reaction of said resilient units respectively, and coacting extensible means rendered operative by said actuating means and incorporated into each of said resilient units respectively and constructed and arranged to actuate the associated shoe relatively away from its adjacent mounting and in a direction across the surface of said work support during the operation of said actuating means whereby the adjacent edge portions of said piece of work are held in firmly abutted relation and forced together by the respective shoes on the outer ends of the resilient units.

6. In a machine for working upon a seam between adjacent edge portions of a blank comprising a backstop for said edge portions, mountings arranged laterally adjacent said backstop, and clamping mechanisms to engage and hold the adjacent edge portions of said blank upon said backstop, said clamping mechanisms each comprising a number of flexing units each consisting of superimposed bars extending from one of said lateral mountings to a position above and adjacent to said backstop, one of said bars having one end secured to the adjacent mounting and having its free end secured to said other bar, a shoe carried by said bars at their connected ends and adapted to engage one edge portion of said blank, said other bar having a guide bracket to slidably engage said one bar to permit relative motion between said bars at their unconnected ends, and one of said bars having an arched portion curving outwardly and away from said other bar, and actuating means arranged to engage and flatten said arched portion of said one bar in a direction against said other bar to thereby cause elongation of said arched bar to simultaneously transmit bodily lateral movement to the connected shoe in a direction across said backstop while depressing both bars with said actuating means toward said backstop and upon said blank.

7. In a machine for working upon a seam between adjacent edge portions of a blank comprising a backstop for said edge portions, mountings disposed laterally adjacent said backstop, and clamping mechanisms to engage and hold the adjacent edge portions of said blank upon said backstop, said clamping mechanisms each comprising a number of flexing units each consisting of superimposed bars extending from one of said lateral mountings to a position above and adjacent to said backstop, one of said bars having one end secured to the adjacent mounting and having its free end secured to said other bar, a shoe carried by said bars at their connected ends and adapted to engage one edge portion of said blank, said other bar having a guide bracket to slidably engage said one bar to permit relative motion between said bars at their unconnected ends, and one of said bars having an arched portion curving outwardly and away from said other bar, and actuating means arranged to engage and flatten said arched portion of said one bar in a direction against said other bar to thereby cause elongation of said arched bar to simultaneously transmit bodily lateral movement to the connected shoe in a direction across said backstop while depressing both bars with said actuating means toward said backstop and upon said blank, said actuating means comprising a pressure unit for each set of flexing units disposed in overlying relation with respect thereto, and said actuating means being arranged to engage each of the adjacent flexing units at the arched bar portion of said superimposed coacting bars thereof.

8. In a machine for working upon a seam between adjacent edge portions of a blank comprising a backstop for said edge portions, mountings disposed laterally adjacent said backstop, and clamping mechanisms to engage and hold the adjacent edge portions of said blank upon said backstop, said clamping mechanisms each comprising a number of flexing units each consisting of superimposed bars extending from one of said lateral mountings to a position above and adjacent to said backstop, one of said bars having one end secured to the adjacent mounting and having its free end secured to said other bar, a shoe carried by said bars at their connected ends and adapted to engage one edge portion of said blank, said other bar having a guide bracket to slidably engage said one bar to permit relative motion between said bars at their unconnected ends, and one of said bars having an arched portion curving outwardly and away from said other bar, and actuating means arranged to engage and flatten said arched portion of said one bar in a direction against said other bar to thereby cause elongation of said arched bar to simultaneously transmit bodily lateral movement to the connected shoe in a direction across said backstop while depressing both bars with said actuating means toward said backstop and upon said blank, and continuous reactionary means interposed between each actuating means and the adjacent set of flexing units whereby the total power of said actuating means is fully transmitted and distributed over all of said flexing units during the work contacting cycle of said clamping mechanisms.

9. In a seam welding machine, in combination, a longitudinally extending support for the seam, mounting beams extending longitudinally above, parallel to and spaced laterally on each side of said support, longitudinally extending shoes parallel to and above said support and laterally spaced from the centerline of said support, a plurality of uniformly spaced transversely extending means to support and actuate each shoe, said means consisting of two superimposed bars connected together and to said shoes at their inner ends, the upper bar having an arched center portion extending upwardly and being secured at its outer end to the beam, the lower bar being flat and having a slidable connection at its free end to the upper bar, and expanding means positioned between each beam and the arched portions of the bars to simultaneously actuate the bars to produce downward and inward movement of the shoes.

10. In a seam welding machine, in combination, a support for the seam, mounting beams spaced laterally on each side of said support, shoes laterally spaced from the centerline of said support and extending thereover, a plurality of transversely extending means to support and actuate each shoe, said means consisting of two superimposed bars connected together and to said shoes at their ends adjacent said support, the upper bar having an arched portion extending upwardly and being secured at its outer end to the beam, the lower bar having a slidable connection at its free and outer end with the upper bar, and expanding means positioned between each beam and the arched portions of the bars to simultaneously actuate the bars to produce downward and inward movement of the shoes.

11. In a seam welding machine, in combination, an elongated support to carry adjacent seam parts of a blank thereon, and clamping mechanisms arranged at opposite sides of said support to provide means operative to engage said adjacent seam parts to orient said parts upon said support, said clamping mechanisms each comprising a mounting laterally flanking said support, a shoe to engage an adjacent seam part, and a plurality of clamp units carried by said mounting and connected to suspend said shoe over its adjacent seam part, said clamp units each comprising a pair of cooperative superimposed flexible bars arranged for limited endwise shifting of portions thereof with respect to each other, one of said bars being connected with said mounting to flex relative thereto and the other bar being connected with said shoe, actuating means operative to flex both bars toward said support, and means rendered operative by said actuating means to endwise actuate one bar relatively to the other of said bars to actuate said shoe in a direction across said support.

12. In a seam welding machine, in combination, an elongated support to carry adjacent seam parts of a blank thereon, and clamping mechanisms arranged at opposite sides of said support to provide means to operatively engage the adjacent seam parts of said blank upon said support, said clamping mechanisms each providing a mounting flanking said support, a shoe to contact an adjacent seam part, and clamp units to suspend said shoe from said mounting, said clamp units each comprising a coacting pair of connected elements carried by said mounting and arranged for connection with said shoe to actuate said shoe relatively to said support, at least one of said elements being flexible and connected with said mounting to bodily flex relative to said mounting, and the other element being connected with said shoe, actuating means operative to move both elements toward said support, and one of said coacting elements including extensible means to endwise actuate a portion of said one element relatively to the other of said elements and to actuate said shoe in a given direction across said support.

13. In a seam welding machine, a support to carry adjacent seam parts of a blank thereon, and clamping mechanisms arranged to either side of said support to orient said companion seam parts upon said support, said clamping mechanisms each comprising a mounting, a shoe to engage an adjacent seam part of the blank, and a plurality of coacting connected bodily flexible clamp units each carried by said mounting and supporting said shoe for bodily swinging movement relatively to said mounting, said units including pressure responsive extensible means adapted for bodily displacement of said shoe away from said mounting, and deflecting means to operatively contact said coacting flexible clamp units to bodily flex said units to swing said shoe about said mounting and downwardly upon said adjacent seam part, said deflecting means functioning to render said extensible means operative to move said shoe away from said mounting and across said seam part in a direction across said support and away from said mounting.

14. A clamping mechanism to engage surface portions of a pair of edge abutting blank parts at locations adjacent the open seam therebetween to position and to retain such parts in coacting relation to accommodate seam closing equipment, said clamping mechanism comprising in combination with a back-up support to react against the underside of said blank parts, spaced coacting clamp structures flanking said support and arranged to engage said blank parts respectively, each of said clamp structures having a plurality of clamp units, a mounting to carry said units, and a shoe carried by said units and arranged adjacent and above the support and cooperating with said support to hold the adjacent blank part upon said support, said units each comprising coacting means connected with said shoe and operative to bodily actuate said shoe toward its adjacent blank part and in a direction across the surface thereof, each of said coacting means comprising a pair of bars extending laterally away from said support, one of said bars having connection with said mounting, the other bar being connected with said shoe, said bars being connected together at one end and having the other ends thereof freely associated for relative endwise movement, and one of said bars having a hump intermediate the length thereof, and bar flexing means constructed and arranged to engage said bars at said hump to bodily swing said bars to bring the attached shoe into contact with the adjacent blank part and to then collapse said hump of said one bar to flatten the latter to elongate said hump bar whereby said shoe is initially actuated downwardly and upon the adjacent blank part in the direction of said support and said shoe is subsequently urged laterally in a direction traversing said support.

15. A clamping mechanism to engage surface portions of a pair of edge abutting blank parts at locations adjacent the open seam therebetween to position and to retain such parts in coacting relation to accommodate seam closing equipment, said clamping mechanism comprising a back-up support to react against the underside of said blank parts, and spaced coacting clamp structures flanking said support to engage said blank parts respectively, each of said clamp structures comprising a shoe arranged adjacent and above the support and cooperating with said support to hold the adjacent blank part upon said support, a mounting, and a plurality of coacting means connected with said shoe and operative to bodily actuate said shoe toward its adjacent blank part and in a direction across the surface thereof, each of said coacting means having connection with said mounting and comprising a pair of bars extending transversely with respect to said support, one of said bars being connected with said mounting, the other bar being connected with said shoe, said bars being connected together at one end, and guide means on the other end of one of said bars and coacting with said other bar to permit relative motion between said bars at said adjacent ends, one of said bars having a hump thereon disposed between said joined bar ends and the guide means end of said one bar, and bar flexing means arranged for contact with said hump of the one bar to actuate both of said bars and shoe toward said support and upon the adjacent blank part, said hump being collapsed against said other bar by said bar flexing means whereby said shoe is actuated in a direction across the surface of said support.

16. An apparatus adapted for exerting pressure against the surface of a blank supported upon an arbor and to urge said blank in a given direction across the surface of the arbor to hold the blank in a predetermined lateral reference position upon said arbor for the accommodation of selected processing equipment to work on said blank, said apparatus comprising, in combination, an arbor to provide a support for the underside of a blank, a plurality of clamp units adapted to engage the top side of said blank, a mounting to support said clamp units in extended relation and in a given location over said arbor, a clamp member carried by said clamp units in a position above said arbor and over the blank, each of said clamp units including an upwardly deformed section in the length thereof, and power operated means arranged for downward contact against the deformed section of each clamp unit to bodily depress said unit to bring said clamp member down toward said arbor and against the blank thereon, continued depression of said clamp unit by said power operated means against said deformed section of the clamp unit automatically causing said unit to elongate whereby to urge said clamp member in a direction across the surface of the blank to urge the latter into the reference position upon said arbor while increasing the reactionary force of said member against the blank.

17. An apparatus adapted for exerting pressure against the surface of a blank supported upon an arbor and to urge said blank in a given direction across the surface of the arbor to hold the blank in a predetermined transverse reference position upon said arbor for the accommodation of selected processing equipment to work on said blank, said apparatus comprising, in combination, an arbor to provide a support for the underside of a blank, a plurality of elongated resilient clamp units adapted for engaging the top side of said blank, a mounting to support said clamp units, said clamp units each having their end portions rigidly secured to said mounting and having their free ends extending outwardly from the mounting and in a given relation above said arbor, a clamp shoe connected with the free ends of said clamp units to be positioned thereby above said arbor and over said blank, each of said clamp units including an upwardly deformed portion in the length of said units, and actuating means arranged for contact against the deformed portions of the clamp units to bodily flex each unit downwardly to urge said clamp shoe against the surface of said blank supported upon said arbor, continued depression of each of said units by said actuating means upon said deformed portion of each unit causing said unit to elongate and to bodily urge said shoe along the surface of the blank to urge the latter into said transverse reference position upon said arbor while increasing the holding force of said shoe upon the blank under the reaction of the arbor against the underside of said blank.

18. In a seam welding machine, in combination, an arbor to carry adjacent seam parts of a blank thereon, and clamping mechanisms arranged at opposite sides of said arbor to provide means to engage said seam parts to hold the same downwardly against said arbor and to urge said parts against each other, said clamping mechanisms each comprising a mounting flanking said arbor, a shoe to overlie the adjacent arbor supported seam part, and a plurality of flexible finger structures connected with said mounting and supporting said shoe, said finger structures each including an upwardly formed hump section located intermediate the mounting and said shoe, and actuating means disposed over said hump sections of said finger structures to operatively contact and to downwardly flex said finger structures to cause said shoe to bodily engage the adjacent arbor supported seam part, continued downward motion of said actuating means causing flattening the respective hump sections of said finger structures to increase the length of said structures to impart limited lateral motion of the connected shoe in relation to said arbor and to thus frictionally urge said shoe along the engaged surface portion of said seam part to urge said part toward its companion part carried upon said arbor.

19. In a seam welding machine, a work support to carry the adjacent edges of a piece of work to be welded, a work holding mechanism comprising spaced mountings flanking said support, clamping units suspended in cantilever fashion from each of said mountings including flexible fingers having deformed portions to subject said fingers to elongation upon the application of pressure against said deformed portions, said fingers projecting toward said work support, shoes connected with and carried by the fingers of each set and arranged to engage the respective supported edges of said piece of work to orient the latter with respect to said support, and actuating means to operatively contact and to bodily deform all of the fingers to direct the shoes thereof into reactionary holding contact with the supported edges of the piece of work and to urge the edges together as directed by the elongation of the fingers of said sets respectively, said actuating means each comprising an expandible member adapted to expand in the direction of the deformed portions of said fingers in the adjacent set and including a continuous reactionary member interposed between said expandible member and the fingers of said adjacent set, said reactionary member providing means to bridge the multiple flexible fingers of the set, said reactionary member functioning to equalize the transmission of and to distribute the entire applied force developed by said expandible member against all of the individual fingers in the set.

20. In a seam welding machine, a work support to carry the adjacent edges of a piece of work to be welded, a work holding mechanism comprising spaced mountings flanking said support, clamping units suspended in cantilever fashion from each of said mountings including flexible fingers having deformed portions to subject said fingers to elongation upon the application of pressure against said deformed portions, said fingers projecting toward said work support, shoes connected with and carried by the fingers of each set and arranged to engage the respective supported edges of said piece of work to orient the latter with respect to said support, and actuating means to operatively contact and to bodily deform all of the fingers to direct the shoes thereof into reactionary holding contact with the supported edges of the piece of work and to urge the edges together as directed by the elongation of the fingers of said sets respectively, said actuating means each comprising an expandible member adapted to expand in the direction of the deformed portions of said fingers in the adjacent set and including a continuous reactionary member interposed between said expandible member and the fingers of said adjacent set, said reactionary member providing means to bridge the multiple flexible fingers of the set, said reactionary member functioning to equalize the transmission of and to distribute the entire applied force developed by said expandible member against all of the individual fingers in the set, each of said reactionary members and its adjacent cooperative set of fingers being provided with coacting positioning elements to orient and to maintain said reactionary member in operative pressure transmitting relation with respect to the deformed portions of said fingers under all conditions of operation.

References Cited in the file of this patent
UNITED STATES PATENTS

| | | |
|---|---|---|
| 1,840,737 | Peck | Jan. 12, 1932 |
| 1,987,691 | Lincoln | Jan. 15, 1935 |
| 2,256,879 | Cornell | Sept. 23, 1941 |
| 2,371,376 | Bisbee | Mar. 13, 1945 |
| 2,607,310 | Evans | Aug. 19, 1952 |
| 2,685,629 | Peck | Aug. 3, 1954 |
| 2,696,547 | Felton et al. | Dec. 7, 1954 |

FOREIGN PATENTS

| | | |
|---|---|---|
| 644,590 | Great Britain | Oct. 11, 1950 |